United States Patent [19]

Hegarty et al.

[11] 4,417,449
[45] Nov. 29, 1983

[54] PROCESS FOR SEPARATING CARBON DIOXIDE AND ACID GASES FROM A CARBONACEOUS OFF-GAS

[75] Inventors: William P. Hegarty, Wescosville; William P. Schmidt, Allentown, both of Pa.

[73] Assignee: Air Products and Chemicals, Inc., Allentown, Pa.

[21] Appl. No.: 339,360

[22] Filed: Jan. 15, 1982

[51] Int. Cl.$^3$ .................................................. F25J 3/00
[52] U.S. Cl. ......................................... 62/28; 62/33; 62/34; 62/39
[58] Field of Search ...................... 62/39, 9, 11, 19, 32, 62/33, 34, 23, 24, 31, 28; 55/73, 55, 68; 208/11 R; 48/196 R, 196 FM, 197 R, 197 AM, 215, DIG. 6

[56] References Cited

U.S. PATENT DOCUMENTS

| | | | |
|---|---|---|---|
| 2,880,591 | 4/1959 | Kwauk | 62/39 |
| 2,886,405 | 5/1959 | Benson et al. | 23/3 |
| 4,014,575 | 3/1977 | French et al. | 299/2 |
| 4,075,081 | 2/1978 | Gregoli | 208/11 |
| 4,117,886 | 10/1978 | Honaker | 166/259 |
| 4,158,467 | 6/1979 | Larson et al. | 43/24 |
| 4,169,133 | 9/1979 | Staege | 423/437 |
| 4,169,506 | 10/1979 | Berry | 166/256 |
| 4,270,937 | 6/1981 | Adler et al. | 62/17 |

FOREIGN PATENT DOCUMENTS

77/7157 12/1977 South Africa .

Primary Examiner—Frank Sever
Attorney, Agent, or Firm—Geoffrey L. Chase; E. E. Innis; J. C. Simmons

[57] ABSTRACT

A process is described for the separation of carbon dioxide and sulfide gases from oil shale retorting off-gases, coal gasification off-gases, oxygen fireflooding off-gases or carbon dioxide miscible flood enhanced oil recovery off-gases for recycle to a retort, gasifier, petroleum reservoir or to further sulfide processing prior to export. The process separates the off-gases into an essentially sulfur-free light BTU fuel gas, a heavy hydrocarbon stream and a carbon dioxide acid gas stream wherein the off-gas is compressed if necessary and cooled to separate the various streams. The carbon dioxide acid gas stream is expanded in an auto-refrigeration step to provide the necessary process refrigeration. In the oil shale retort and coal gasification applications the sulfur constituents are sorbed on spent oil shale particles or coal ash.

14 Claims, 1 Drawing Figure

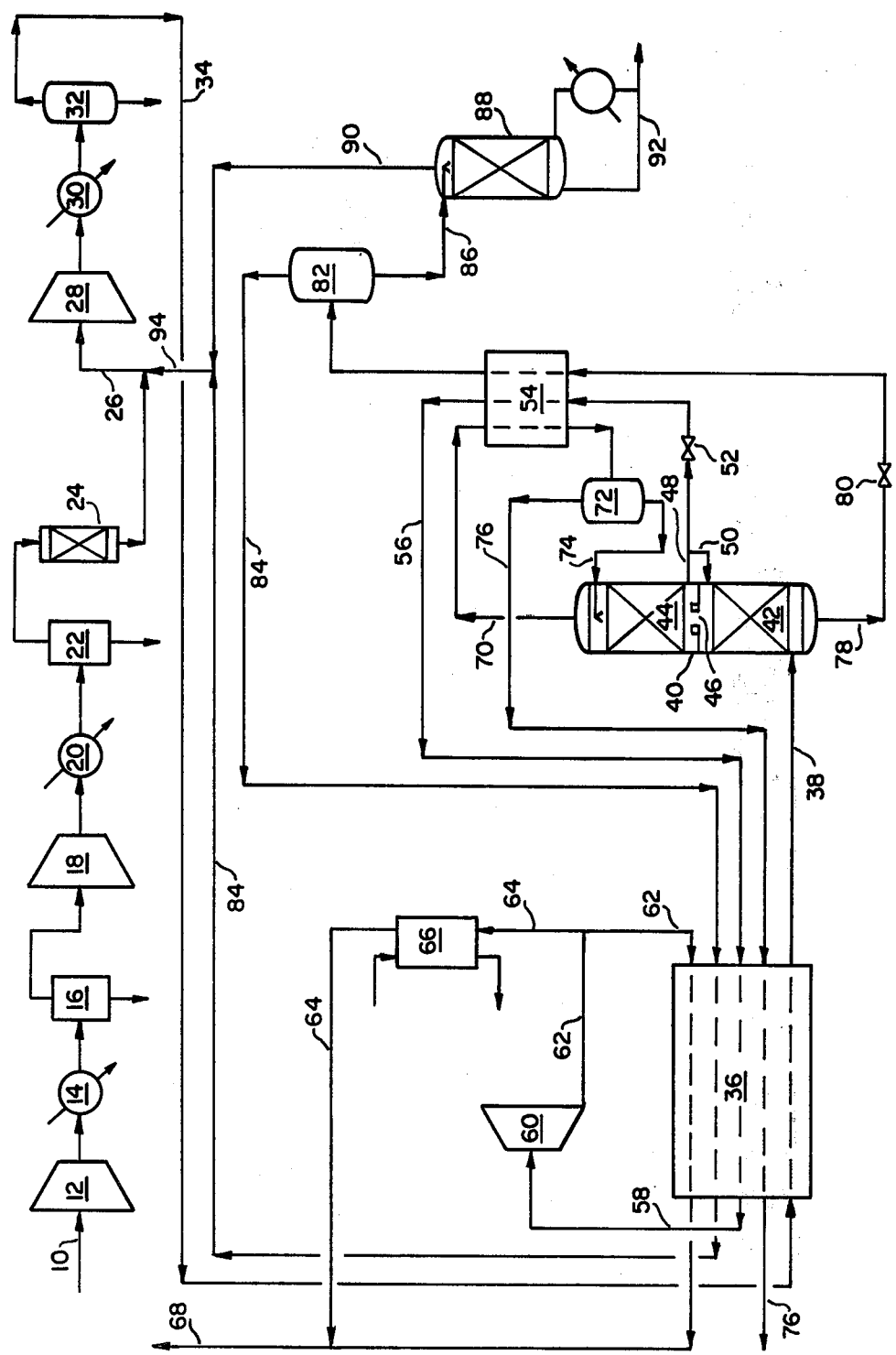

PROCESS FOR SEPARATING CARBON DIOXIDE AND ACID GASES FROM A CARBONACEOUS OFF-GAS

TECHNICAL FIELD

The present invention is directed to the field of separating gas streams from various synthetic fuel and synthetic gas production processes, oxygen fireflooding and enhanced oil recovery operations. The process of the present invention is more specifically directed to the recycling of carbon dioxide from the off-gas of one of the above enumerated processes wherein the off-gas contains a major portion of carbon dioxide and lesser portions of other acid gases and higher hydrocarbons. The process is also directed to the recovery of low sulfur, low BTU fuel gas from the off-streams of the enumerated processes. The present invention has particular relevance to the recycling of carbon dioxide as a modifier in in-situ oil shale retorting operations.

BACKGROUND OF THE PRIOR ART

With the recent dramatic increase in the costs of all forms of energy and the attendant efforts to procure and utilize older, more traditional energy resources as well as petroleum resources, the need for large quantities of inert gases either as moderators or pressure sustaining mediums has become of strategic importance. Carbon dioxide gas has been one of the inert gas mediums to be utilized in such projects. Carbon dioxide has been a readily achieveable combustion product which although having relatively low production expense is still costly enough that a cyclic use of the gas would benefit the economics of any of the number of energy related processes to which this invention is related.

Oil shale retorting and specifically in-situ oil shale retorting is one of the processes to which the present invention concerning the recycle of carbon dioxide is particularly pertinent. Oil shale is a sedimentary geologic formation generally found in greatest abundance in the western states of the United States. Various oil shales contain varying percentages of a hydrocarbonaceous component which is called kerogen. Kerogen comprises the petroleum resource which has made oil shale of significant interest to those attempting to meet the energy requirements of the industrialized world. By mining oil shale and heating it to the liquefaction point of the kerogen component, the hydrocarbonaceous component of the oil shale can be readily recovered for further refinement into oil products which are similar to the liquid petroleum oil products presently recovered from oil wells. In order to liquefy the kerogen component of oil shale it is necessary to retort the oil shale either in-situ within the ground or within a surface retort being supplied with mined oil shale ore. In an in-situ oil shale retort process, the oil shale is blasted into a concise rubble pattern in which the outer limits of the blast zone constitute the retort container or vessel. In surface retorting, traditionally mined oil shale is supplied in a particulate form to a traditional retort vessel where the necessary heat is supplied to liquefy and separate the kerogen content. The two forms of oil shale retorting have different modes of operation, both of which are well known and documented in the prior art. Generally, in-situ oil shale retorting is a batch operation in which the oil shale is ignited by a burning gas and then the combustion is continued downwardly through the rubblized oil shale formation by the combustion of char contained in the oil shale until the in-situ blast pattern is exhausted. This is a non-steady state operation. In comparison, surface retorting of oil shale is usually done in a continuous manner under steady state conditions in which the burn zone is maintained centrally within the retort and the material to be processed, namely oil shale, is fed downwardly through the retort vessel for consumption. In either of these combustion processes a steady flow of an oxidant gas is required. Only an initial flow of combustible fuel gas is required in order to initiate the burn. The burn is sustained by burning the char residue of the particulate shale. Using either oxygen gas or air as the typical oxidant requires an additional gas as a diluent in order to moderate the peak combustion temperatures to avoid melting the shale to a slag and to avoid producing excessive energy consuming carbonate decomposition. Steam and carbon dioxide gas are known retort diluents. During the operation of the retort, substantial quantities of liquid hydrocarbon oil and off-gases are produced. The off-gases comprise combustion products, oil shale volatiles and diluent gas. The liquid phase of the effluent from the retort is separated from the gaseous phase of the effluent and the gaseous phases can then be cleaned and vented or recycled alternately. Of course, the liquid phase is refined as the primary fuel source. Various sulfur compounds such as hydrogen sulfide and carbonyl sulfide are found in the off-gases from the retort and these gases present a problem to the disposal or use of the retort off-gases. It has been found that the sulfides can be absorbed on the spent oil shale if the acid gas portion of the off-gas is recycled to the retort. Additionally, when the off-gas is depleted of any BTU fuel components the off-gas serves as an excellent moderator or diluent gas which can be combined with the retort influent. In this manner, the diluent gas is mixed with an oxidant such as oxygen gas and the mixture is fed to the retort to sustain the char burn.

In surface and in-situ combustion type coal gasification processes, moderators are typically added to the input air or oxygen. In surface gasifier retorts, steam has typically been used to hold peak temperatures to levels where the coal ash will not slag. In in-situ coal gasification processes, steam has been added to avoid excessive temperatures with high heat losses into surrounding strata and to avoid burnout of the oxidant injection lance. Steam has the advantage that it is easily separated as condensate by cooling the gasifier effluent. It has the disadvantage that the condensate requires expensive treatment to remove contaminants and that energy requirements for steam generation are high. In the established Lurgi dry ash moving bed gasifier retort using steam and oxygen, the energy required for the steam is 3 to 4 times greater than that required to supply the oxygen. Carbon dioxide has been proposed as a combustion moderator for coal gasification, but has not been widely used even though it has been potentially available for recycle from the gasifier effluent. High energy requirements of existing processes for separating the $CO_2$ for recycle have presumably discouraged its use.

In oxygen fireflooding, an oxidant gas is used to combust an oil formation which does not naturally produce due to the lack of natural in-situ pressure, high oil viscosity or unfavorable formation structure. The oxidant gas is supplied in an injection well to spontaneously combust the formation or to sustain artificially initiated combustion of the oil. The combustion heats the oil, lowers its viscosity and allows the oil to be recovered from a producing well. A significant amount of $CO_2$ as well as other gases from the combustion are recovered with the produced oil. These gases can be separated in the present invention and with additional sulfur treatment, the $CO_2$ gas can be pipelined to other enhanced recovery operations.

In carbon dioxide miscible flood enhanced oil recovery operations, high pressure carbon dioxide is injected into a partially depleted oil reservoir. The carbon dioxide serves to extract and displace the residual oil to a production well that discharges carbon dioxide and recovered oil to the surface at reduced pressure. The oil product liquid phase is separated from the carbon dioxide and hydrocarbon gas phase. The gas can be processed in the present invention process to separate a hydrocarbon gas product and carbon dioxide for reinjection to the reservoir.

In the above-stated combustion processes in which carbon dioxide recycling occurs, it is environmentally as well as economically beneficial to recycle the carbon dioxide off-gases as a diluent gas for the combustion operation and to absorb any sulfur containing components from the off-gases onto the remaining combusted media, such as spent oil shale or coal ash. Such a method avoids the costly preparation of steam diluent and provides greater selectivity of diluent proportion that a more conventional air mixture diluent. Of course, the recycle of off-gases offers an attractive method by which to avoid contamination of the environment with noxious sulfur contaminants such as sulfides in various forms.

Various prior art processes have been developed for the recycling of such off-gases as are the by-product of coal gasification, oil shale retorting, oxygen fireflooding and other enhanced oil recovery operations. These prior art processes generally suffer from high energy consumption and a complexity of process apparatus which requires high capital expenditure.

In U.S. Pat. No. 2,886,405, a process is disclosed for the separation of carbon dioxide and hydrogen sulfide from gas mixtures utilizing a chemical absorbent solvent, such as hot potassium carbonate. As is typical in chemical solvents, the enriched solvent is regenerated by a boiling and steam stripping operation. Such regeneration is an energy intensive operation.

The prior art in U.S. Pat. No. 4,014,575 teaches that off-gases from oil shale retorting can be recycled through spent oil shale beds for the deposition of sulfur compounds from the off-gas onto the particles of the oil shale bed. This can be done in conjunction with the water scrubbing of the off-gases in a Venturi scrubber.

Another method has been utilized to scrub the off-gases from oil shale retorting wherein water containing basic components from an oil shale retort bed is contacted with the acid gas containing off-gas stream of an operating oil shale retort. The basic pH water neutralizes the acid off-gases and the later can be recycled for retorting or burned if sufficient BTU energy can be derived. This process is described in U.S. Pat. No. 4,117,886.

In U.S. Pat. No. 4,158,467, a process for the recycling of oil shale retort off-gases is disclosed wherein the hot potassium carbonate solvent of U.S. Pat. No. 2,886,405, mentioned above, is utilized. As stated before, the utilization of chemical absorbent solvents in such an operation is energy intensive due to the complexity of regenerating such solvents for reuse. Additionally, the chemical absorption process is essentially nonselective. That is complete absorption of acidic sulfur compounds would be accompanied by complete absorption of contained carbon dioxide.

The removal of acid gas components from gas streams is discussed in U.S. Pat. No. 4,169,133 wherein the carbon dioxide acid gas component is frozen out of the main gas stream. A process wherein a solid product is produced from a gas clean-up operation is not conducive to the recycling of such a component, such as in the present invention.

In U.S. Pat. No. 4,169,506, the scrubbing of off-gases from in-situ retorting of oil shale is set forth. The scrubbing utilizes caustic soda in conjunction with a deoiling process. In this instance, the scrubbed sulfur components are passed to a Claus plant for refinement to elemental sulfur.

In South African published Application 77/7157 of Dec. 1, 1977 a process is disclosed for the separate removal of sulfides and carbon dioxide from a coal gasification gas stream. Externally supplied refrigeration is necessary to operate a complex solid/liquid absorbent stream in a process which operates on carbon dioxide containing streams in the 55% carbon dioxide range. Corresponding U.S. Pat. No. 4,270,937 of June 2, 1981 discloses similar subject matter.

Attempts by the prior art to solve the various problems in the economical provision of a diluent or pressurizing gas for a oxidant fed combustion process or a pressure enhanced oil recovery operation have been deficient for several reasons, including: the energy intensive nature of the combustion scrubbing recovery operations, the necessity for regeneration of chemical solvents by steam stripping operations, the need for large quantities of water for scrubbing operations in retorting or combustion locations which may be deficient in adequate water resources to make such recovery systems operational and the uneconomical separation and recycle of pressurizing fluids in enhanced oil recovery operations. Furthermore, many of the prior art systems fail to incorporate a system for the separation of hydrocarbons from the carbon dioxide diluent and sulfide components of the off-gas streams related to the present invention. The hydrocarbons contemplated are specifically the $C_4+$ hydrocarbons which are produced in these fuel conversion combustion processes and necessarily from the intermingling of a pressurizing gas with a petroleum reservoir.

The present invention overcomes these drawbacks by providing a low energy, low temperature system for the recovery of recyclable gases including propane from the off-gases of carbonaceous combustion retorting and pressure enhanced oil recovery operations. The present invention achieves this recovery of recyclable gases such as carbon dioxide, acidic sulfide gases and propane, by low temperature separation in two stages. Furthermore, the present invention process does not require the utilization of potentially scarce and valuable water resources at the site of the recycling operation.

With respect to oxygen fireflooding and other enhanced oil recovery operations, such as $CO_2$ miscible flood enhanced recovery, the present invention can be used to extract and pipeline bulk $CO_2$ after additional sulfur removal in the former process or to recycle $CO_2$ in a non-combustion process in the latter operation.

BRIEF SUMMARY OF THE INVENTION

The present invention is directed to a process for separating a carbon dioxide containing off-gas containing acid gases such as hydrogen sulfide and carbonyl sulfide as well as hydrocarbon gases such as propane and higher hydrocarbons. The off-gas is separated into a carbon dioxide and sulfide containing recycle stream, a light fuel gas stream containing predominantly carbon monoxide, hydrogen, methane and ethane, and a heavy hydrocarbon stream containing butane and higher molecular weight hydrocarbons. The process comprises the compression and aftercooling of an off-gas containing such acid gases, light fuel gases and heavy hydrocarbons, drying the compressed and aftercooled off-gas to remove moisture therefrom, subcooling the off-gas and a carbon dioxide and sulfide-rich recycle stream from the downstream portion of the process against product streams in a heat exchanger, separating the subcooled off-gas in a two-tiered distillation column to provide an initial fuel gas stream as an overhead fraction, a carbon dioxide and sulfide liquid side stream as an intermediate fraction and an initial heavy hydrocarbon and carbon dioxide stream as a bottom liquid fraction, expanding the carbon dioxide and sulfide side stream in an auto-refrigeration cycle for the subcooling of the off-gas in the heat exchanger before releasing the stream as a carbon dioxide and sulfide product stream for recycle or export, separating said initial fuel gas stream into a final fuel gas stream and a carbon dioxide stream which is recycled to said column as reflux to the upper portion of said column, separating said initial heavy hydrocarbon and carbon dioxide stream into a carbon dioxide stream which is recycled to the compression stage of the process and an essentially pure heavy hydrocarbon stream as a product stream from said process.

It is an object of the present invention to utilize the subject process for the separation and recycling of the off-gas from an oil shale retorting operation.

It is another object of the present invention to utilize the subject process for the separation and recycling of the off-gas from a coal gasification operation.

It is a further object of the present invention to utilize the subject process for the separation and recycling of the off-gas from a carbon dioxide miscible flood enhanced oil recovery operation.

It is also an object of the present invention to utilize the subject process for the separation and potential recycling of off-gas from an oxygen fireflooding operation.

It is an object of the present invention to remove butane and higher hydrocarbons from an off-gas stream by the cooling and refluxing of the stream with sufficient carbon dioxide to individually separate the butane and higher hydrocarbons from the remaining off-gas stream and then separately distilling the carbon dioxide reflux and higher hydrocarbon stream to isolate essentially pure higher hydrocarbons such as butane and higher molecular weight hydrocarbons.

It is a further object of the present invention to utilize the subject process to treat a carbon dioxide rich gas from surface or in-situ retorting of coal and oil shale.

It is an object of the present invention to process a sulfur-containing off-gas stream which contains 90% or more carbon dioxide.

It is another object of the present invention to separate off-gases already at high pressure in the subject process without further compression of the off-gas as a step in the process.

Finally it is an object of the present invention to separate and recycle a portion of the carbon dioxide of an off-gas from either a combustion process or an enhanced oil recovery process in a low energy and efficient manner.

BRIEF DESCRIPTION OF THE DRAWING

FIG. 1 is a flowsheet diagram of the preferred embodiment of the present invention.

DETAILED DESCRIPTION OF THE INVENTION

The present process is applicable to the recycling of carbon dioxide gas and other acid gases from an off-gas stream produced by oil shale retorting, coal gasification, oxygen fireflooding or carbon dioxide miscible flood enhanced oil recovery operations. In the former two processes, a combustion is utilized to produce a fuel medium from a solid carbonaceous source. In the case of oil shale, the solid carbonaceous source is called kerogen. In the instance of coal, the solid carbonaceous source consists of various polynuclear aromatic ring compounds which make up the structure of coal. In the latter two processes mentioned above, the recycled gases are utilized to recover liquid hydrocarbons such as petroleum in formations which are not naturally producing because of high viscosities, surface tensions and the lack of natural pressure in the petroleum formations. In the processes of oil shale retorting and coal gasification, the extent of the the combustion necessary for product fuel recovery differ to a great extent. In oil shale retorting, an insubstantial amount of combustion is carried out in order to provide heat for the liquefaction and cracking of the constituents of the kerogen. However, in coal gasification, a substantial or nearly complete combustion and gasification is conducted in order to provide hydrogen and carbon monoxide fuel products from the aromatic constituents of the solid coal. In oxygen fireflooding, again an insubstantial amount of combustion is produced by injecting a gaseous oxidant into a liquid petroleum formation such that only sufficient combustion occurs to reduce the viscosity of the petroleum stock within the formation by the heat of combustion such that the petroleum is recoverable in a producing well. In contrast, carbon dioxide miscible flooding enhanced oil recovery involves no deliberate combustion whatsoever, but rather the high pressurization of the petroleum formation with carbon dioxide in order to dissolve the oil in the high pressure carbon dioxide and move a single phase carbon dioxide and oil medium toward a producing well.

In the combustion processes under consideration by this invention, a diluent gas is usually needed in order to control the peak temperature of combustion. In the case of oil shale, the combustion temperature is limited to avoid melting the mineral content of the shale and to avoid producing excessive energy consuming carbonate decomposition. In the case of coal gasification, the combustion is controlled in order to prevent the melting of coal ash to slag in the reaction zone. With respect to oxygen fireflooding, it can be necessary to control the initial combustion when the burn front within the oil holding formation is small such that excessive oil burning does not occur and such that burn through from the injection well to the production well does not circumvent a patterned, controlled firefront burn. Steam and the inert portions of air have been utilized in the prior art to attempt to control the combustion rate in such reactions. The use of carbon dioxide as a diluent gas has also been disclosed in the prior art. Carbon dioxide has also been utilized in the prior art for miscible flooding in enhanced oil recovery operations. The present invention is directed to the use of carbon dioxide gas as a diluent for oil shale retorting, coal gasification and oxygen fireflooding as well as a pressure fluid phase in enhanced oil recovery. More specifically, the present invention is directed to the recovery of carbon dioxide from the off-gas of the above-identified processes and the processing of the recovered carbon dioxide for recycle to such operations. In addition, sulfur compounds which are inherently found in oil shale, coal minerals and some petroleum formations can be recouped from the off-gases of such operations and reintroduced into their respective mineral formations for the deposition of the sulfur compounds on the combusted minerals to avoid subsequent air pollution or clean-up problems with respect to such sulfur compounds. In the case of oxygen fireflooding, after initial combustion it may be necessary to further process the carbon dioxide product stream of the present invention to remove sulfur compounds in order to use the carbon dioxide in distant industrial utilities.

With reference to the description which follows, the processing of solid carbonaceous sources will sometimes be described as retorting, but this should not be construed as limited to oil shale retorting, but is meant to include the gasification of coal as well as oxygen fireflood combustion.

As shown in FIG. 1, the preferred embodiment of the present invention is shown wherein a highly concentrated carbon dioxide gas stream is recovered from a retort, but as indicated above, the applicable gas purification and recycling is appropriate to other similar off-gas producing processes such as coal gasification, oxygen fireflooding and enhanced oil recovery operations. In order to demonstrate the invention and its utility as clearly as possible, the following description will be made with reference to an in-situ oil shale retorting operation. In such an operation a mixture of an oxidant, such as air or oxygen with a diluent gas such as carbon dioxide is introduced into a retort zone of oil shale material. Combustion is initiated by an ignited fuel gas intoduced into the oil shale reaction zone, but the combustion is sustained by the introduction of the oxidant and diluent gas stream which burns residual char left on the retorted shale. The hot combustion gases that are produced from the char and oxidant are passed downstream through fresh shale which heats the fresh shale to retort and produce oil vapor and combustible gases. As the hot gases and oil vapor move further downstream, they are cooled by fresh shale and the oil vapor condenses to liquid which is carried out of the retort with the gases. The liquid hydrocarbon fraction is separated from the off-gas which consists of carbon dioxide, a low BTU fuel component consisting of carbon monoxide, hydrogen and methane, higher level hydrocarbons such as propane, butane and other high molecular weight hydrocarbons referred to as heavy hydrocarbons, as well as sulfur containing compounds from the oil shale such as hydrogen sulfide and carbonyl sulfide. It is this type of off-gas product which is processed in the flow scheme of the present invention.

The off-gases of a carbon dioxide recycle system such as those coming from an in-situ oil shale retort typically consist of the following carbonaceous gas composition and such a composition is used as exemplary of this process:

TABLE I

| | |
|---|---|
| $CO_2$ | 93.1% |
| $CO$ | 3.9% |
| $H_2$ | 1.1% |
| $CH_4$ | 0.7% |
| $C_2H_6$ | 0.2% |
| $S_x$ | 0.3% |
| $C_3H_8$ | 0.2% |
| $C_{4+}$ | 0.5% |

The off-gas at the influent line 10 has a flow rate of 6,922 CFM. The off-gases are at a pressure of 14 psia and a temperature of 100° F. (38° C.). The off-gases are initially processed in a compression and aftercooling process stage wherein the gas is compressed in compressor 12 and aftercooled in refrigeration or cold water heat exchanger 14 before passing into separator vessel 16. Condensed moisture is removed from the bottom of vessel 16 and the gas proceeds to the next stage of compression and aftercooling in compressor 18 and heat exchanger 20. Again, condensed moisture is removed in a separatory vessel 22 while the gas phase is then processed in a dryer 24 which would typically consist of reversing paired absorbent columns charged with a desiccant such as alumina, or a glycol wash. Alternately, drying can be accomplished by using reversing heat exchangers or regenerators in place of the heat exchanger 36 or by injecting methanol in the feed and withdrawing a methanol and water liquid phase from the cooled exchanger effluent stream 38. These techniques are well established in the prior art. The dried off-gas in line 26 is then combined with a carbon dioxide recycle gas from the downstream equipment introduced from line 94 into line 26. The combined gases are further compressed in compressor 28 with subsequent aftercooling in heat exchanger 30. A further removal of condensibles is performed in separator vessel 32. The compressed gases at 150 psia and 100° F. (38° C.) are then passed to the main heat exchanger 36 through line 34. The influent off-gas stream is cooled against various product streams in the main heat exchanger 36 and leaves the main heat exchanger at a pressure of 150 psia and a temperature of −36° F. (−38° C.).

The subcooled influent off-gas is then introduced into the bottom of a two-tiered distillation column 40. The distillation column 40 is divided into two sets of bubble trays by a trap-out plate 46 situated in the mid section of the column which facilitates withdrawal of a net liquid sidestream. The lower portion 42 of the distillation column mixes a carbon dioxide reflux stream with the incoming off-gas stream to remove butane and higher molecular weight hydrocarbons in a carbon dioxide containing bottom fraction which is removed in line 78. This initial heavy hydrocarbon stream is further processed for concentration as a product stream. The remaining portion of the influent off-gas stream rises through the lower portion 42 of the distillation column 40 and passes trap-out plate 46 wherein the off-gas stream is subjected to a further carbon dioxide reflux stream in the upper portion 44 of the distillation column 40. In the upper portion 44 of the distillation column 40 the separation of light BTU fuel components from the remaining sulfur components is performed. An initial carbon dioxide and sulfide liquid side stream is removed from the lower most section of the upper portion 44 in line 48, and a portion of this stream is split and directed in line 50 to reflux the lower portion 42 of the column. The remaining carbon dioxide and sulfide liquid side stream in line 48 is expanded and cooled by Joule-Thompson expansion through valve 52. This arrangement, using a trap-out tray to remove a liquid stream is one of several techniques possible. The expanded and cooled stream is then introduced into the overhead condenser 54. The rising off-gases in the upper portion of the distillation column 40 after being subjected to two distinct carbon dioxide refluxes are removed as an initial light BTU fuel gas stream from the overhead of the column in line 70. This overhead stream in line 70 is cooled in the overhead condenser 54 and immediately introduced into a separator vessel 72. In this manner, a carbon dioxide rich reflux stream is knocked out of the overhead stream and returned as reflux to the upper portion 44 of the distillation column 40. This reflux is introduced into the column in line 74. The overhead stream from the separator vessel 72 consists of the final light BTU fuel gas stream which is rich in carbon monoxide, hydrogen and methane as well as having a significant amount of carbon dioxide. This stream is removed and rewarmed in the main heat exchanger 36 before leaving the process flow scheme in line 76 as a net light BTU fuel gas product at 139 psia and a temperature of 69° F. (20.6° C.).

The carbon dioxide and sulfide stream which was removed as a side stream 48 in the distillation column 40 after being exchanged in the overhead condenser 54 is passed by line 56 to the main heat exchanger 36. After being exchanged in the exchanger 36, the carbon dioxide and sulfide stream in line 58 is then expanded in turbine expander 60. The temperature of the stream is reduced to −28° F. (−33.3° C.) and this cooled stream in line 62 is then split into a remaining stream in line 62 for refrigeration duty in the main heat exchanger 36, as well as a side stream in line 64 for an export refrigeration heat exchanger 66. The two streams are recombined after heat exchange and are released from the process flowscheme in line 68 as a carbon dioxide and sulfide product stream ready for recycle or sulfide removal prior to export.

The stream removed from the bottom of the distillation column 40 in line 78 containing heavier hydrocarbons such as butane and higher molecular weight hydrocarbons is expanded in a valve 80 in line 78 in order to provide a cooling effect as the stream then passes through overhead condenser 54. As the stream is warmed in passing through the condenser 54 it is then subject to separation in a separatory vessel 82. A predominant amount of the heavier hydrocarbons are separated from the vessel 82 as a bottom stream in line 86. A predominantly carbon dioxide stream is removed as an overhead in line 84. The stream in line 84 is then exchanged in the main heat exchanger 36 before being recycled to the compression stage of the process flowscheme. The heavier hydrocarbon containing stream in line 86 is introduced into a second distillation column 88. The final separation of the heavy hydrocarbons from residual sulfides, propane and carbon dioxide occurs in this distillation column. An essentially pure butane and heavier hydrocarbon stream is removed as a bottom fraction in line 92 from this distillation column 88. These heavy hydrocarbons are in the liquid phase and are released as a product at a pressure of 80 psia and a temperature of 217° F. (102° C.). A predominantly carbon dioxide containing overhead stream is removed from the distillation column 88 in line 90. This carbon dioxide overhead stream 90 is recycled and combined with the overhead carbon dioxide stream 84 and the combined streams in line 94 are recycled to the front end of the process between the second and third compression stages so that the sulfides and minor hydrocarbon portions of these predominantly carbon dioxide streams can be reintroduced into the separatory function of the overall process.

For the process stream specified in Table I, the net power for the auto-refrigeration-separation process is about 0.98 KWH/lb. mole of feed gas. This is chiefly compression requirements. Additional energy for drying would be at a maximum of 0.3 KWH/lb. mole of feed gas. The net power is the feed gas compression power reduced by the recovered expander power. It should be noted however, that the net amount of auto-refrigeration available to the process by virtue of the Joule Thompson effect and the expander turbine refrigeration is limited and is only adequate when proper insulation is available commensurate with established cryogenic engineering practice. If additional heat leak is experienced, then external sources of refrigeration may be required. This would entail some increase in power requirements commensurate with the amount of refrigeration necessary to be provided from outside.

To absorb essentially all the sulfur components in column 40 in order to give essentially sulfur-free light fuel gas in stream 76, upper column section 44 must contain a sufficient number of theoretical contacting stages, and a sufficient carbon dioxide liquid reflux 74 must be provided. Reflux 74 is set to give the required carbon dioxide and sulfide product stream 68 and the reflux required to absorb butane and heavier hydrocarbons in section 42. If stream 68 flow requirements are low, stream 74 flow may be too low to achieve complete absorption of sulfur components. In that case, part of stream 68 can be recompressed and recycled into the feed stream 34 to increase the flow of stream 74 in order to achieve complete sulfur absorption into the net flow of stream 68. This recompression will increase power requirements. The increase may be minimized by recycling from line 58 into a compressor interstage, such as at line 26. Alternately, the net light BTU fuel gas product in line 76 can be discharged from the process system with a residual sulfur content, which can be removed in an auxiliary desulfurization arrangement, if necessary.

The preferred embodiment has been set forth above, but it is understood that various modifications can be made without deviating from the scope of the invention, such as the use of additional or fewer compressors and aftercoolers in the initial treatment of the off-gas stream or in the amount of auto-refrigeration which is provided to the heat exchangers in the process. Rather, the scope of the invention should be determined by the claims which are set forth below.

We claim:

1. A process for the low temperature distillation separation of a carbonaceous off-gas stream containing a quantity of acid gases, such as carbon dioxide, hydrogen sulfide and carbonyl sulfide by separating said off-gas stream into an essentially sulfur free, light fuel gas, an acid gas and a heavy hydrocarbon stream, comprising the steps of:

(a) compressing and aftercooling an off-gas containing acid gases, light fuel gases and heavy hydrocarbons;

(b) drying the compressed and aftercooled off-gas to remove moisture therefrom;

(c) subcooling the combined off-gas and a recycle stream against product streams in a heat exchanger;

(d) separating the subcooled off-gas in a distillation column into an initial fuel gas stream as an overhead fraction, a carbon dioxide and sulfide stream as a liquid sidestream containing the major portion of said quantity of acid gases and an initial heavy hydrocarbon and carbon dioxide stream as a bottom liquid fraction;

(e) expanding the carbon dioxide and sulfide liquid side stream in an auto refrigeration cycle for the subcooling of the off-gas in the heat exchanger of step (c) before releasing the stream as a carbon dioxide and sulfide product stream;

(f) cooling and separating said initial fuel gas stream into a final fuel gas stream containing a minor portion of said quantity of acid gases and a carbon dioxide stream which is recycled to said column as reflux to the distillation column;

(g) separating said initial heavy hydrocarbon and carbon dioxide stream into a carbon dioxide stream containing the balance of said quantity of acid gases which is recycled to the compression stage of the process and a substantially pure heavy hydrocarbon stream which is a product stream of said process.

2. The process according to claim 1 wherein the compression and aftercooling of the off-gases occurs in multiple stages.

3. A process for the low temperature distillation separation of a carbonaceous, pressurized off-gas stream containing a quantity of acid gases, such as carbon dioxide, hydrogen sulfide and carbonyl sulfide by separating said off-gas stream into an essentially sulfur free, light fuel gas, an acid gas and a heavy hydrocarbon stream, comprising the steps of:

(a) subcooling a pressurized off-gas containing acid gases, light fuel gases and heavy hydrocarbons and a recycle stream combined with said off-gases against product streams in a heat exchanger;

(b) separating the subcooled off-gas in a distillation column into an initial fuel gas stream as an overhead fraction, a carbon dioxide and sulfide stream as a liquid sidestream containing the major portion of said quantity of acid gases and an initial heavy hydrocarbon and carbon dioxide stream as a bottom liquid fraction;

(c) expanding the carbon dioxide and sulfide liquid sidestream in an auto refrigeration cycle for the subcooling of the off-gas in the heat exchanger of step (a) before releasing the stream as a carbon dioxide and sulfide product stream;

(d) cooling and separating said initial fuel gas stream into a final fuel gas stream containing a minor portion of said quantity of acid gases and a carbon dioxide stream which is recycled to said column as reflux to the distillation column;

(e) separating said initial heavy hydrocarbon and carbon dioxide stream into a carbon dioxide stream containing the balance of said quantity of acid gases which is recycled to the compression stage of the process and a substantially pure heavy hydrocarbon stream which is a product stream of said process.

4. A process according to claim 1 or 3 wherein the carbon dioxide and sulfide liquid sidestream is expanded to cool the initial light fuel stream to separate a carbon dioxide reflux stream for the distillation column and to provide a portion of the refrigeration for the cooling of the off-gas in the main heat exchanger.

5. The process according to claim 1 or 3 wherein the off-gas is derived from an in-situ oil shale retorting operation.

6. The process according to claim 1 or 3 wherein the autorefrigeration is produced by expanding the carbon dioxide and sulfide stream in an expander turbine to generate refrigeration for the main heat exchanger and for export.

7. The process of claim 1 or 3 wherein the subcooled off-gas is separated in a two-tiered distillation column.

8. The process of claim 7 wherein sulfides are removed from the off-gas in the upper portion of the distillation column and heavy hydrocarbons are removed from the bottom portion of the distillation column.

9. The process according to claim 1 or 3 wherein the off-gas is derived from a coal gasification operation.

10. The process according to claim 1 or 3 wherein the off-gas is derived from an oxygen fireflooding operation.

11. The process according to claim 1 or 3 wherein the off-gas is derived from a carbon dioxide miscible flood enhanced oil recovery operation.

12. The process of claim 1 or 3 wherein the initial heavy hydrocarbon and carbon dioxide stream is expanded and heat exchanged against the initial fuel gas stream so as to recover refrigeration for the distillation column.

13. The process of claim 1 or 3 wherein the feed off-gas comprises 90% or greater of carbon dioxide with the remaining composition comprising fuel components and sulfides.

14. A process for recycling a portion of an oil shale retort off-gas stream containing a quantity of acid gases, such as carbon dioxide, hydrogen sulfide and carbonyl sulfide by low temperature distillation separation of said off-gas stream into an essentially sulfur free, light fuel gas, an acid gas and a heavy hydrocarbon stream, comprising the steps of:

(a) compressing and aftercooling an off-gas from an oil shale retort containing acid gases, light fuel gases and heavy hydrocarbons;

(b) drying the compressed and aftercooled off-gas to remove moisture therefrom;

(c) subcooling the combined off-gas and a recycle stream against product streams in a heat exchanger;

(d) separating the subcooled off-gas in a two tiered distillation column into an initial fuel gas stream as an overhead fraction, an initial carbon dioxide and sulfide acid gas stream as a liquid sidestream containing the major portion of said quantity of acid gases and an initial heavy hydrocarbon and carbon dioxide stream as a bottom liquid fraction;

(e) expanding the initial carbon dioxide and sulfide stream in order to cool the initial fuel gas stream in a heat exchanger;

(f) cooling and separating said initial fuel gas stream into a final fuel gas stream containing a minor portion of said quantity of acid gases and a carbon dioxide stream which is recycled to said column as reflux to the distillation column;

(g) further expanding the carbon dioxide and sulfide side stream in an expander turbine to produce auto refrigeration for the subcooling of the off-gas in the heat exchanger of step (c);

(h) separating said initial heavy hydrocarbon and carbon dioxide stream into a carbon dioxide stream containing the balance of said quantity of acid gases which is recycled to the compression stage of the process and a substantially pure heavy hydrocarbon stream which is a product stream of said process;

(i) recycling said carbon dioxide and sulfide stream to an oil shale retort as a product stream.

* * * * *